(12) United States Patent
Yakubov

(10) Patent No.: US 8,458,084 B2
(45) Date of Patent: Jun. 4, 2013

(54) INVESTOR SOCIAL NETWORKING WEBSITE

(76) Inventor: Zelman Yakubov, Brooklyn, NY (US)

( * ) Notice: Subject to any disclaimer, the term of this patent is extended or adjusted under 35 U.S.C. 154(b) by 6 days.

(21) Appl. No.: 13/118,709

(22) Filed: May 31, 2011

(65) Prior Publication Data

US 2011/0302105 A1   Dec. 8, 2011

Related U.S. Application Data

(60) Provisional application No. 61/396,805, filed on Jun. 3, 2010.

(51) Int. Cl.
*G06Q 40/00* (2012.01)

(52) U.S. Cl.
USPC .............................. 705/38; 705/35; 705/36 R

(58) Field of Classification Search
USPC ...................................... 705/35, 38
See application file for complete search history.

(56) References Cited

U.S. PATENT DOCUMENTS

| | | | | |
|---|---|---|---|---|
| 5,630,073 A * | 5/1997 | Nolan | | 705/45 |
| 6,324,353 B1 * | 11/2001 | Laussermair et al. | | 399/16 |
| 6,347,307 B1 | 2/2002 | Sandhu et al. | | |
| 6,405,204 B1 | 6/2002 | Baker et al. | | |
| 7,103,556 B2 | 9/2006 | Del Rey et al. | | |
| 7,149,716 B2 | 12/2006 | Gatto | | |
| 8,150,752 B2 * | 4/2012 | Smith | | 705/35 |
| 2001/0049651 A1 | 12/2001 | Selleck | | |
| 2002/0091607 A1 | 7/2002 | Sloan et al. | | |
| 2002/0147671 A1 | 10/2002 | Sloan et al. | | |
| 2003/0093353 A1 | 5/2003 | Ward et al. | | |
| 2006/0282482 A1 | 12/2006 | Castro et al. | | |
| 2007/0150397 A1 | 6/2007 | Rossen et al. | | |
| 2008/0306851 A1 * | 12/2008 | Weyerman | | 705/35 |
| 2010/0241559 A1 * | 9/2010 | O'Connor et al. | | 705/39 |
| 2010/0250424 A1 * | 9/2010 | Torres | | 705/37 |

* cited by examiner

*Primary Examiner* — Kirsten Apple
(74) *Attorney, Agent, or Firm* — Goldstein Law Offices, P.C.

(57) ABSTRACT

A social networking website system for an individual investor to join as a member, to meet online with other investors and discuss investing. The social network facilitates finding and communicating among like-minded individuals by providing the investor with a plurality of searching tools for searching a member profile page, a portfolio, and provides online communication tools such as a chat room, a forum and video posting. The member easily researches important information regarding stocks, commodities, bonds, foreign currency, futures, and other types of financial instruments by entering a ticker symbol that becomes a prefix key linking to an online data synopsis about the investment. The investor social networking system also provides a member a mechanism for placing orders to buy or sell financial instruments through the website.

20 Claims, 11 Drawing Sheets

FIG. 7

INVESTOR SOCIAL NETWORKING WEBSITE

CROSS-REFERENCE TO RELATED APPLICATIONS

This application is a nonprovisional utility application of the provisional patent application Ser. No. 61/396,805 filed in the United States Patent Office on Jun. 3, 2010 and claims the priority thereof.

BACKGROUND OF THE INVENTION

The invention relates to an investment social networking system. More particularly, it relates to an online investor social networking system that allows individuals interested in investing in stocks, commodities, bonds, foreign currency, futures, and other types of financial instruments to track their investments and discuss investing with other users that have a similar interest through a website. The investor social networking system also provides a medium for members to place orders to buy or sell financial instruments through the website.

In the past several years social networking websites have changed from a fad used by a small number of technology-savvy individuals to some of the most trafficked websites with hundreds of millions of subscribers. Facebook®, (Facebook® is the registered trademark of FACEBOOK, INC., Palo Alto, Calif.) the most popular social networking website, has become the second most frequented website in the world, after the search engine Google®. (Google® is the registered trademark of Google Inc., Mountain View, Calif.) Social networking sites provide the opportunity to contact individuals throughout the globe quickly and easily with no investment other than a computer or a "smart" phone and an Internet connection.

Whereas most of the currently available social networking websites are directed towards personal use by allowing communication between individuals regarding friendships, dating status, photos, travels, and allowing professional networking such as found in the LinkedIn® network. (LinkedIn® is the registered trademark of LINKEDIN CORP. Mountain View, Calif.) There are no social networking sites directed towards investors interested in communicating with other investors, tracking their investments, researching investments, and buying or selling financial instruments. Investors must rely upon information in making informed decisions whether to buy, sell, or hold their financial instruments and require information regarding the price of stocks, which stocks or commodities are "hot," whether a new bond issue will take place, whether the value of a foreign currency will come up or down, etc. Serious investors are also interested in being able to buy or sell stocks, commodities, bonds, foreign exchange, futures, and other types of financial instruments easily.

Presently, social networking websites are directed towards facilitating personal relationships between individuals and at best, allow general professional communication. They are not directed towards investing and do not possess functionalities to most efficiently allow investors to communicate regarding their investments and portfolios. They also do not let investors obtain information regarding their financial instruments. Finally, they also do not allow actual trading of financial instruments.

Online trading of stocks, commodities, bonds, foreign exchange, futures, and other types of financial instruments are well known. These websites, however, do not allow an individual to communicate with other investors; at best, they allow communication with brokers and other professionals. Typically, they merely allow the purchase or sale of financial instruments and the individual purchaser must rely on information obtained from other sources, often not at the same time as making the transaction.

While these units may be suitable for the particular purpose employed, or for general use, they would not be as suitable for the purposes of the present invention as disclosed hereafter.

SUMMARY OF THE INVENTION

It is an object of the invention to allow a user interested in investing to network online with other like-minded users who are also interested in investing. Accordingly, the invention is an online social networking system for a user interested in discussing investing to join as a member to meet and communicate with other like-minded members through a social networking environment.

It is another object of the invention to provide educational tools for a user to learn more about investing, investment instruments, investment strategies, and financial matters generally. Accordingly, the invention is an online social networking system for a member user, the system providing a framework for a plurality of educational media including on-line seminars, forums, e-books (electronic books) and publications to educate the member about investing.

It is a further object of the invention to allow a user to instantly find a synopsis of market data for an investment. Accordingly, the invention is an online social networking system that provides a synopsis of market data whenever a user enters a ticker symbol for an investment within an application on the social networking system, such as in a chat room, a forum, or a mail application, the ticker symbol becoming a prefix key for linking to market data for the investment.

It is still a further object of the invention to allow a user to track data about the user's investments online in a plurality of display modes as well as share the data with other users. Accordingly, the invention is an online social networking system that provides an online portfolio application, allowing the user to track data on the investments in the user's portfolio in a selective mode of display such as in a quarterly chart and allowing the user to share a portion of his portfolio with a plurality of other selected users, choosing what data to share with each selected user.

It is yet another object of the invention to allow a plurality of users to form an investing group. Accordingly, the invention is an online social networking system that provides a group page, the group page having a group portfolio, the group page linking to a group member's page, allowing the group members to participate in the group's investments.

It is still another object of the invention to allow a user to share information about a market product to other users in an online community who are interested in investing. Accordingly, the invention is an online social networking system that provides a user the ability to upload information about a market product onto a social networking website tabbed page that is accessible to all users in the online community.

It is still a further object of the invention to allow a user to perform research and place an order online for a plurality of stocks, commodities, bonds, foreign currency, and other financial instruments within the same website. Accordingly, the invention is an online social networking system that provides links to an electronic trading system of a plurality of trading houses, such as brokers and dealers so that a user can place an order and the electronic trading system executes the order through a clearinghouse of the trading house.

The invention is a social networking website system for an individual investor to join as a member, to meet online with other investors and discuss investing. The social network facilitates finding and communicating among like-minded individuals by providing the investor with a plurality of searching tools for searching a member profile page, a portfolio, and provides online communication tools such as a chat room, a forum and video posting. The member easily researches important information regarding stocks, commodities, bonds, foreign currency, futures, and other types of financial instruments by entering a ticker symbol that becomes a prefix key linking to an online data synopsis about the investment. The investor social networking system also provides a member a mechanism for placing orders to buy or sell financial instruments through the website.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 4 is a display of an exemplary home page of an investor social networking website.

FIG. 5 is a display of an exemplary synopsis of financial data for a financial instrument, namely Microsoft Corporation common stock.

FIG. 7 is a display of an exemplary online chat in progress in a background window with the exemplary data synopsis display in a foreground window, the data synopsis called up by a prefix ticker symbol in the online chat.

DETAILED DESCRIPTION OF THE PREFERRED EMBODIMENTS

Figure 1:
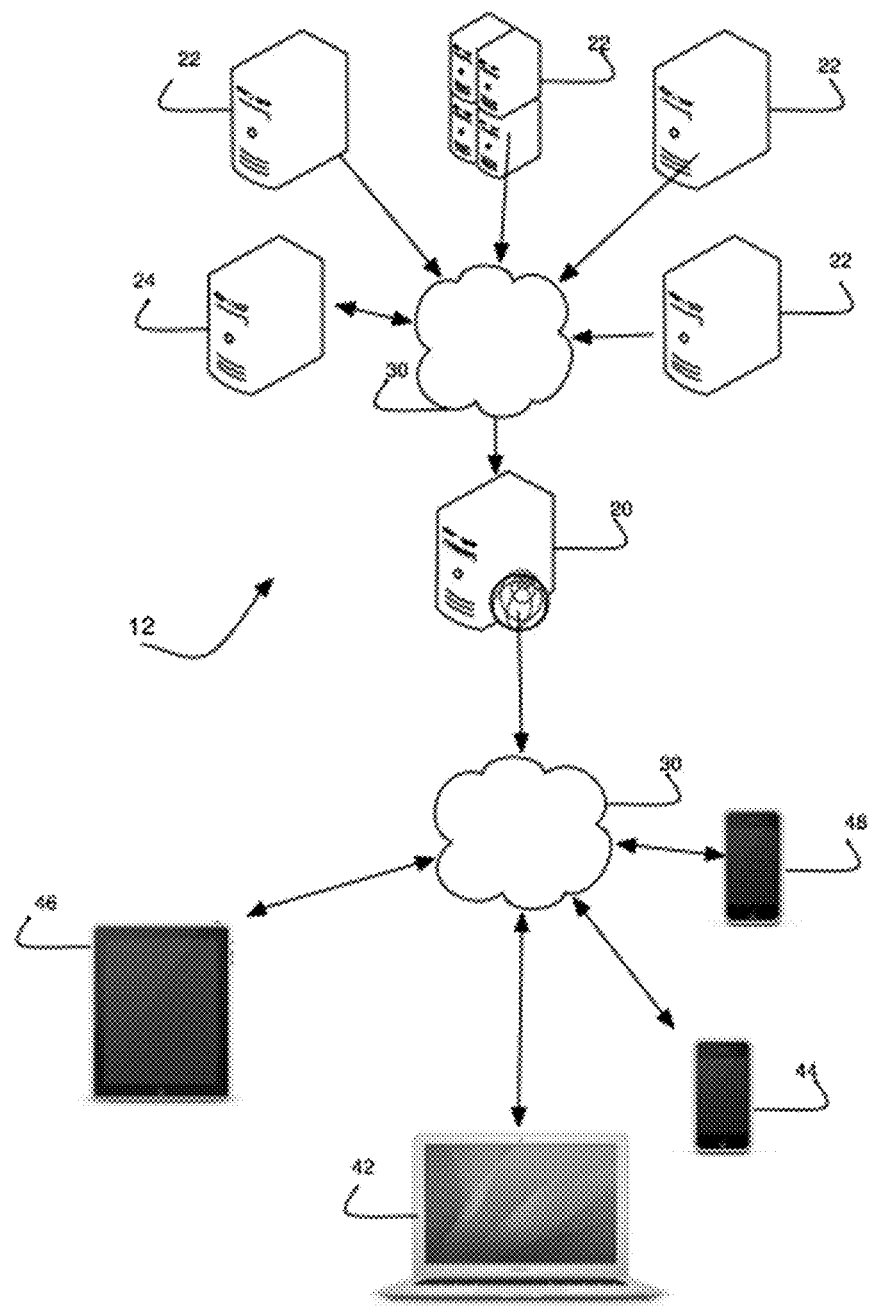
FIG. 1 is a schematic diagram of an investor social networking system.

FIG. 4 is a screenshot of a login home page 400 for interfacing with an investor social networking system on a website, demonstrating broadly an embodiment of the invention. The login home page 400 displays financial information such as a scrolling display of financial news 406, a graphical representation 402 of an equity or a financial market, and a plurality of tabular displays 404 of market statistics such as a market or a market sector. Financial instruments are represented by a ticker symbol 410. Unique and novel to the invention is using the ticker symbol as a prefix key. Ticker symbols 410 are used in a lettering system to identify a specific financial instrument such as, but not limited to, a stock, a mutual fund, an exchange-traded fund (ETF) as well as a sector of a financial market such as for example, the banking sector, represented by "^BKX" or an interest rate such as "!FFUNDS" representing the federal funds Rate. Ticker symbols are well known to those of ordinary skill and beyond the scope of this discussion. A prefix key is a key sequence that is associated with a keymap. A keymap extends the key sequence, creating an executable command, which in the embodiment of the invention, is a command to display in a new window, a data synopsis of the financial instrument represent by the ticker symbol prefix key 410. The command is executed when the user clicks the prefix key 410 directly. The prefix key functions as described wherever it is displayed or entered by the user on the website of the invention, as described in greater detail hereinbelow.

Referring to FIG. 4, the website has a plurality of tabs 412 for pull-down menus on a tool bar 408 for a user to selectively engage when browsing through the website. When a user joins the social networking network system, becoming a member, the user can access a plurality of functions through the pull-down menus on tabs. The tabs 412 include, for example, but not limited to, a quotes menu, a charts menu, a company menu, an options menu, a market menu and a portfolio management menu, allowing the user to access comprehensive, detailed and exhaustive information about a selected financial instrument, a selected market or market sector as well as manage an investment portfolio. Unique to the invention, is the tab labeled "Traders Community" 420, which is a social network portal tab 420 for entering into the social network of the system. Through the "Traders Community" tab 420, the user enters the social network of users to exchange thoughts, opinions, ideas and feelings and communicate generally with other users about investing. The social networking system provides a plurality of tools for communicating such as a plurality of chat rooms and forums, described in detail hereinbelow. It is understood that the "Traders Community" is an exemplary and non-limiting label for the social network portal tab 420 and the tab may be labeled by other names within the inventive concept.

Figure 6:
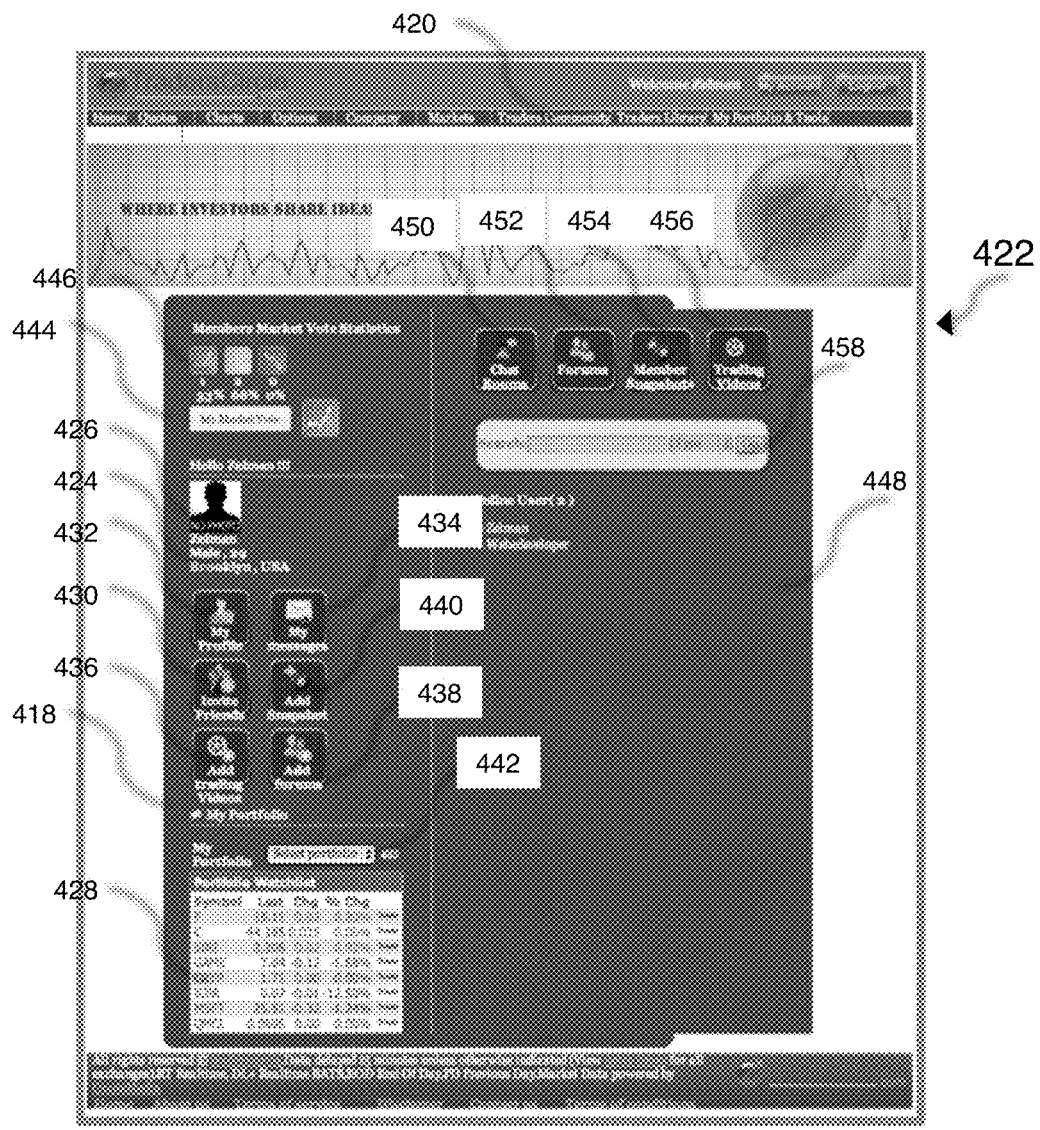
FIG. 6 is a display of an exemplary portal page for entry into the social network of the system.

FIG. 6 shows the portal page 422 into the social network of the system. The user selects the tab 420 marked "Traders Community" to enter the portal. The portal page 422 is the hub for navigating the investor social networking website, introducing and connecting the user with other members. The portal page 422 displays a plurality of icons in a plurality of page segments, the user selecting an icon to engage directly or indirectly with other users or to create or modify the user's profile as explained hereinbelow. To engage in the social network, the user establishes a profile, the profile having a plurality of segments, the profile displayed in a first segment 418 of the portal page 422. The segment displays a brief description of the user 424, which selectively includes a user name, a pictorial representation of the user 426, gender, age and residence of the user and a selected portfolio watch-list 428 of the user. The user may establish multiple watch-lists of the financial instruments the user holds or is interested in following, the user selecting the watch list from a pull-down menu 442. The user selectively names the watch-list 428 either by classification, such as the sector, investment type or some other identifying characteristics. The watch-list is searchable by other users, so that the user can find a second user with interests in the same financial instrument. When the user finds the second user with the same interest, the user sends a request to become a "friend," selecting the icon 430 for inviting friends. The portal page has icons, for example, but is not limited too, editing the user's profile icon 432, email icon 434 for reading and sending email messages sent through the social network, adding a video icon 436, adding a forum icon 438 and posting a snapshot icon 440, the snapshot, a graphical representation of a financial instrument performance fixed in time, the video, the snapshot, and the friend added to the user's profile. The portal pages also has a second segment 444, the second segment having poll icons 446, the user selectively chooses to indicate the user's outlook, for example, but not limited to, on the market, on the economy, the selected icon graphically communicating the outlook to other users.

The portal page 442 has a third segment 448 for entering the social network. The user selects icons in the third segment 448 on the portal page to enter the social network. The user selects the icon that connects the user to, for example, but not limited to, a chat room icon 450, a forum icon 452, a financial instrument snapshot icon 454, or a trading video icon 456.

Figure 5:
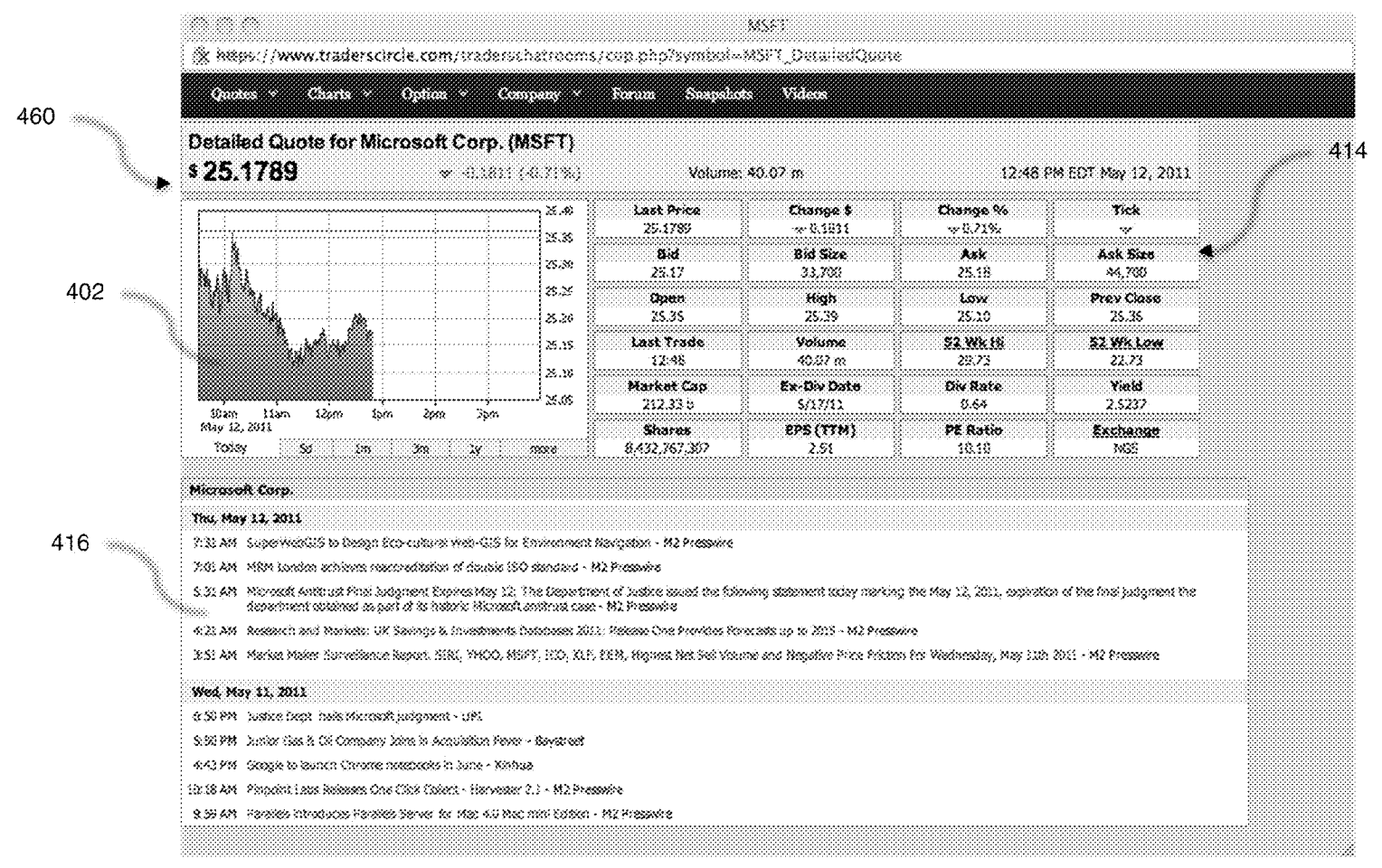
Figure 7:
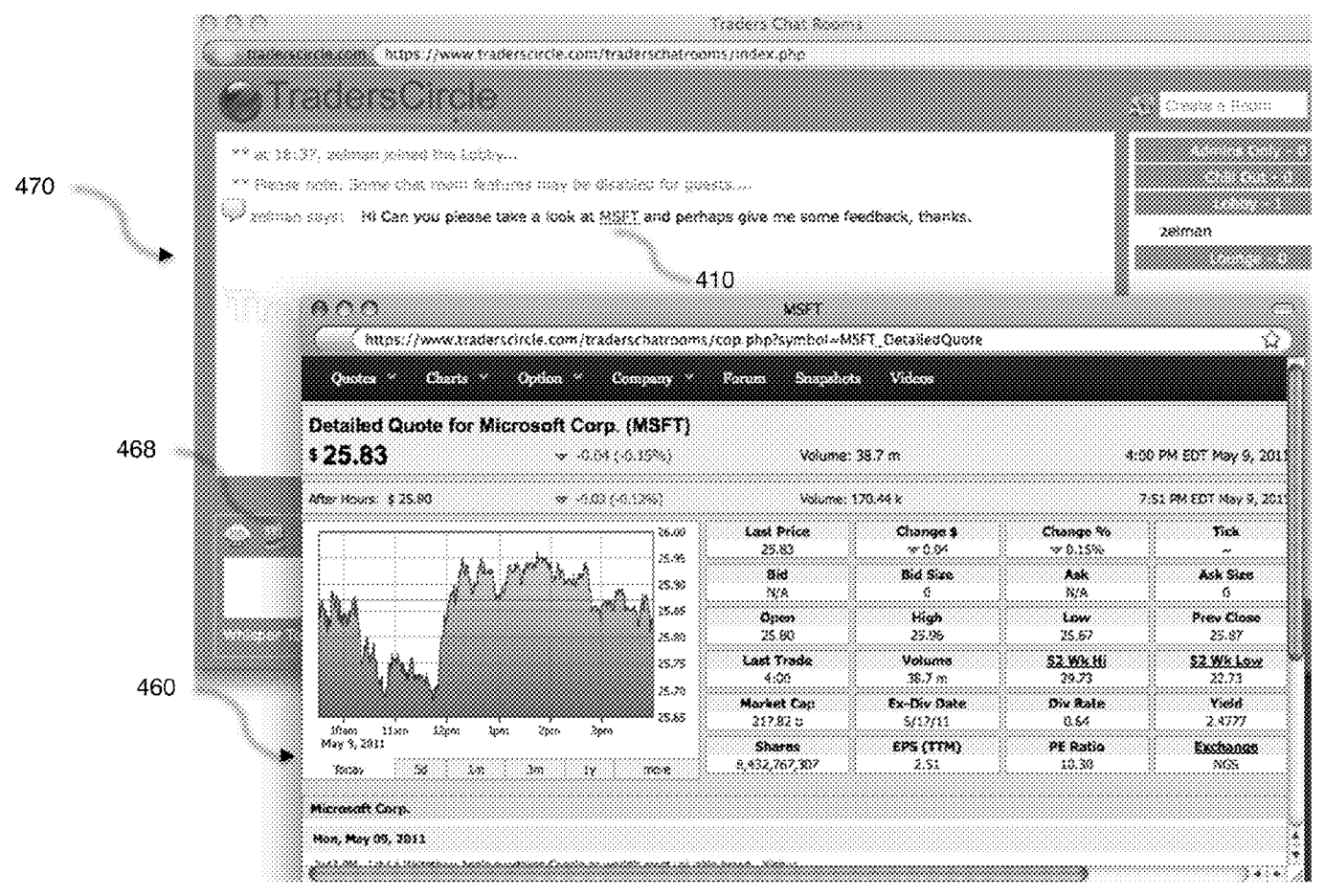
Figure 7A:
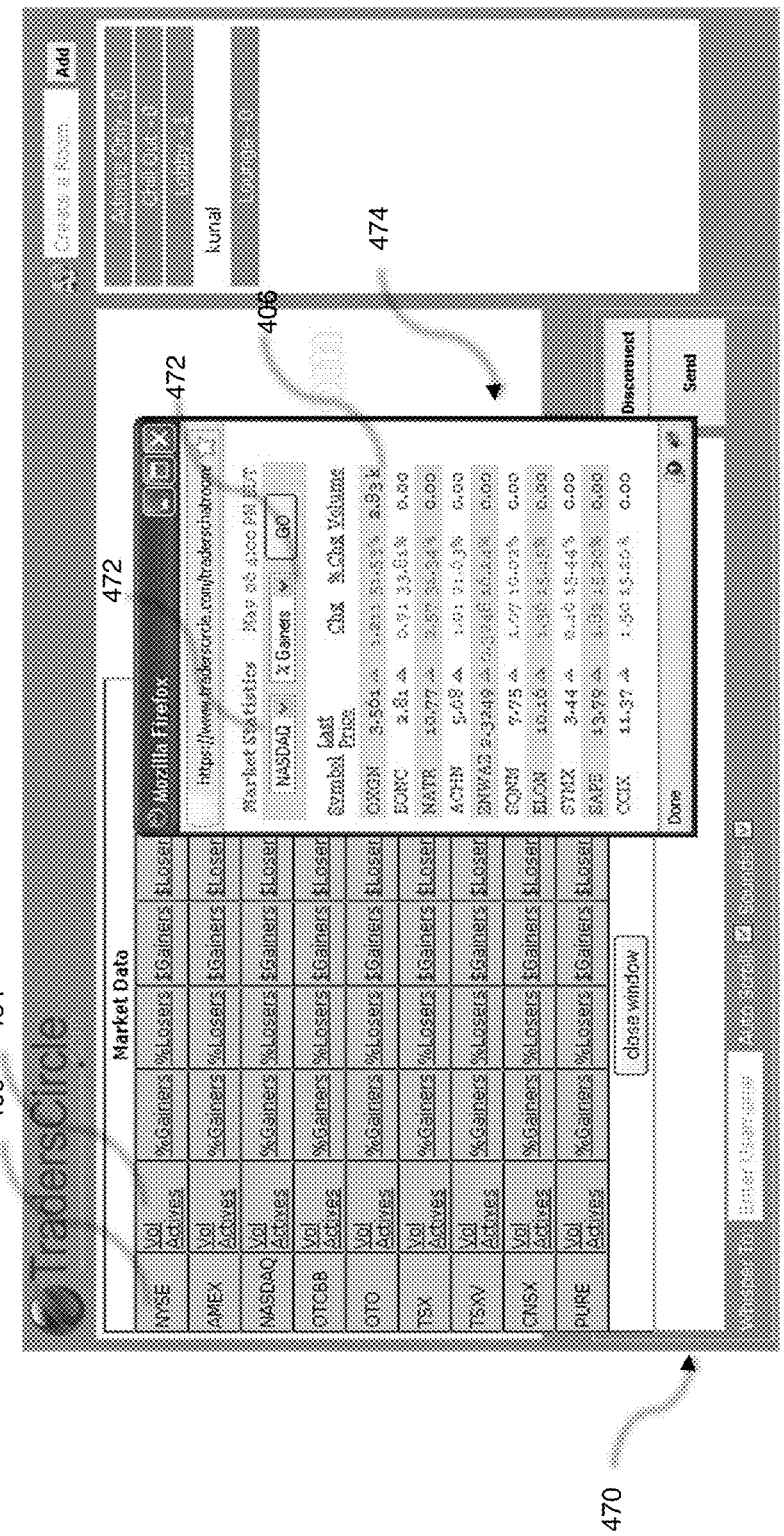
FIG. 7A is a display of the exemplary online chat in progress in a background window with market status data display in a foreground window, the market status data called up by a hotkey in the chat window.

After entering the social network through the portal page, interacting with other users directly or indirectly in the social network, the ticker symbol prefix keys function to open a display of a data synopsis for the associated financial instrument. FIG. 5 shows an exemplary data synopsis display 460 that will be used throughout this discussion. FIG. 7 shows a chat in progress in a chat window 470 in a chat room. A chat room is an electronic venue for users to participate in a conversation online in real time by a first user entering text that is seen in a display window by other users, who in turn, enter text in the display window in response and is well known to those of ordinary skill. In the investor social network system, the user asks other users for an opinion about a financial instrument, such as in the example shown, Microsoft Corporation, represented by the ticker symbol MSFT. The user enters the "MSFT" symbol 410 and other users in the chat room click on the ticker symbol prefix 410 and a second window displays the data synopsis 460 for Microsoft Corporation. It is understood by those of ordinary skill, that clicking is the action of the user moving a cursor to a certain location on a screen with an input device, such as, for example, but not limited to, a mouse, a stylus, a joystick, or a finger, and selecting by a means associated with the input device. In one embodiment, unique to the investor social network chat room are market icons 468 that link to status of different financial market such as NYSE (New York Stock Exchange) or NASDAQ (National Association of Securities Dealers Automated Quotations), different market sectors, different currencies and other typical financial data, displaying real-time or slightly delayed market status. The status, shown in FIG. 7A, are displayed in tabular form of a plurality of columns and rows, a first column 466 the name of the market, a second column 464 containing a plurality of hotkeys, one hotkey associated with each market. When the user clicks on the selected hotkey, a new display window opens for the selected market. The user selects from a pull-down menu 472, a list 474 of gainers or losers, based on different criteria or selects to look at a different market. The user continues the chat in the chat window 470 while reviewing the list 474.

Figure 8:
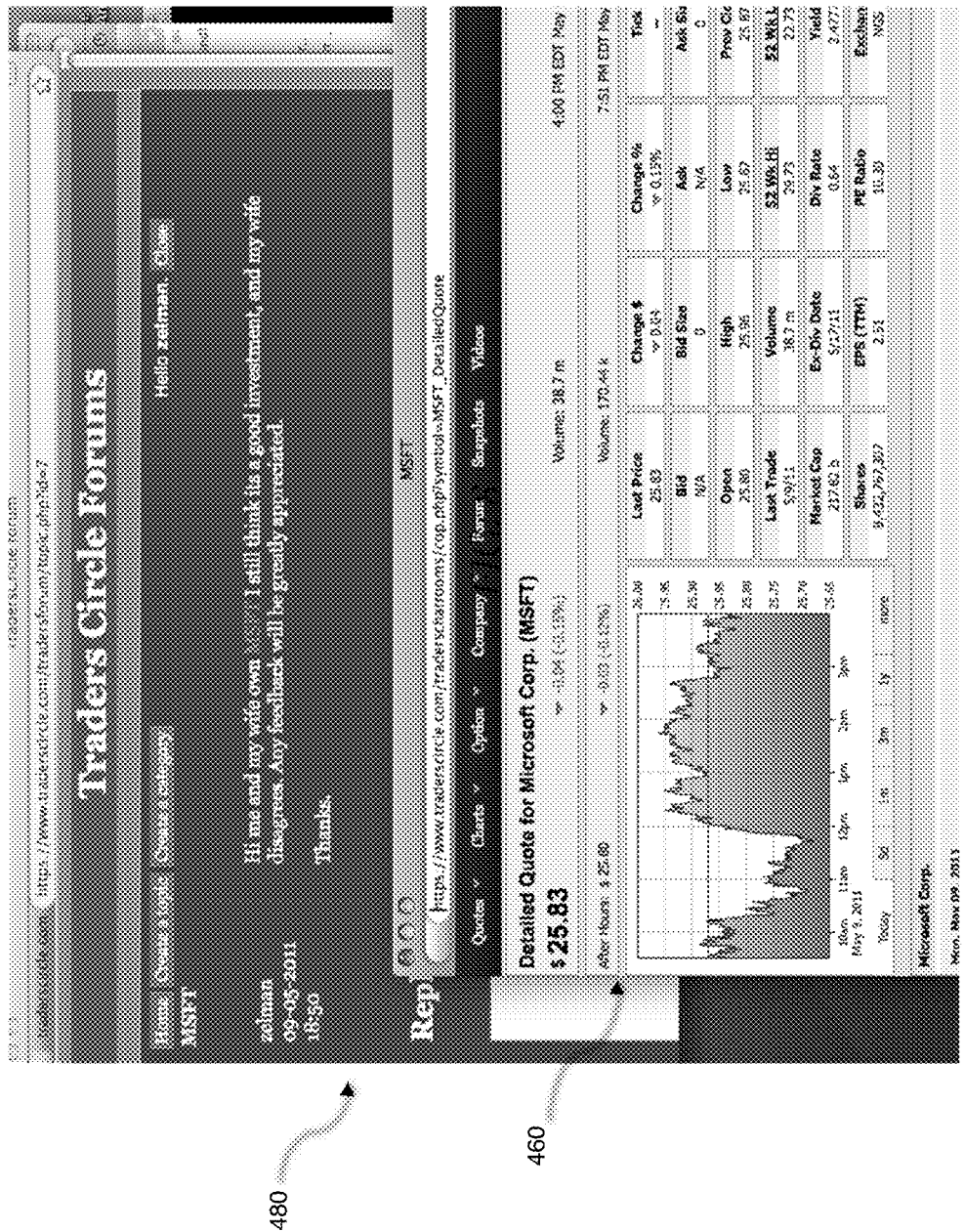
FIG. 8 is a display of an exemplary online forum in progress in a background window with the data synopsis display in a foreground window, the data synopsis called up by the prefix ticker symbol in the online forum.

FIG. 8 shows a forum page 480 where there is an ongoing discussion about a topic, which is in this example, Microsoft Corporation. The prefix symbol MSFT 410 is displayed in the forum. A forum is where messages are posted by the first user and viewed and selectively responded to by other users over a time and are well known to those of ordinary skill. The user clicks on the symbol 410 and a second window displays the data synopsis 460 for Microsoft Corporation. The prefix symbol 410 connects the user to the associated data synopsis 460 wherever the symbol 410 is displayed in the social network function entered through the portal page shown in FIG. 6.

FIG. 5 shows the data synopsis 460 in detail, again using Microsoft Corporation as a non-limiting example. The window displays a graphical representation 402 of the trading price over a selected time interval, a tabular display 414 of a plurality of financial data such as, for example, but not limited to, current trading price, volume, important financial rations, dividend rate and other data typically considered by an investor. Below the chart 402 and data display 414 are a plurality of headlines 416 for news stories about the associated symbol with links to the full stories, which the user can post to the user profile, post a link in the forum, email to a second user, all by using the social network email function. The email function is well known to those of ordinary skill and a detailed discussion of how it functions is beyond the scope of this discussion.

Figure 9:
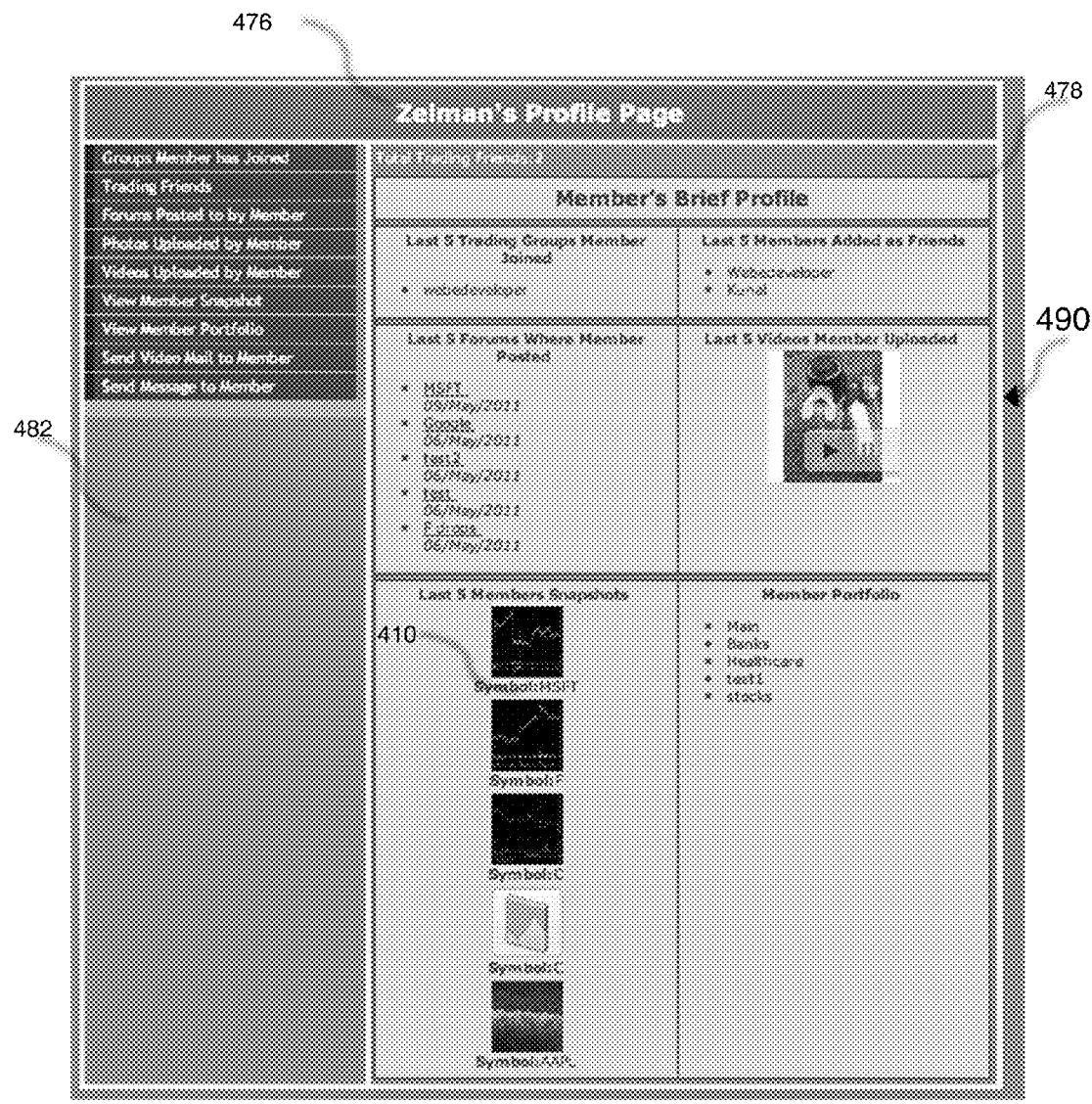
FIG. 9 is a display of an exemplary profile page for the user.

A further example of the prefix symbol 410 is shown in FIG. 9, displaying content of the user profile page 490 within the investor social network. The user name 476 is displayed at the top of the profile page 490. The profile page has a pair of segments for displaying details about the user's online social network. A first segment 478 displays a summary of the recent activity of the user referred to as a brief profile. The last five trading groups the user joined appear, as well as the last five friends added, the last five forums where the user posted, the last five videos the user uploaded, as well as the last five snapshots the user created. Throughout the brief profile segment 478, when the ticker symbol appears it is the prefix symbol, functioning as described hereinabove. The user profile page allows viewing of the full member profile in a second segment 482, including, for example, but not limited to, all the groups the user has joined, all trading friends, all forums posted to the user, all videos uploaded by the user, the user's watch lists and portfolio. The second segment allows, but is not limited to, the sending of video mail or message to a second user. Throughout the functions accessed through the portal page of the social network described hereinabove, as well as other typical social network functions, that are well-known to those of ordinary skill and beyond the scope of this discussion, the prefix ticker symbol 410 links the user to the associated data synopsis wherever the ticker symbol appears.

A user joins the investor social network by selecting the register button and filling out an on-line form, which is not shown, with basic biographical information. The user selects a level of service and a method of payment, the level of service determining the speed of market data delivered to the user by the website, the higher level of service streaming real time data, the lower level of service streaming with a slight delay.

Figure 10:
FIG. 10 is a display of an exemplary portfolio listing for the user.

Referring to FIG. 4, the user accesses the user's online portfolio through the tool bar 408 by clicking on portfolio tab to view current holdings. The current market position for each financial instrument is displayed in a tabular portfolio listing 486 as shown in FIG. 10. Each financial instrument tabular listing is by ticker symbol 410 and thus is a prefix key to link to the associated data synopsis. Each financial instrument listing has a trading button 488 so that when a user clicks on the button, the user directly enters into a trading website of a selected trading house, the user selectively placing an order to buy or sell the financial instrument, the selected the trading house executing the order. A trading house is a financial institution such as an investment bank, brokerage or trader allowed by law to execute financial transactions such as the buying and selling financial instruments. The direct trading button 488 from the online portfolio listing 486 to the trading house allows the user to quickly place an order in response to analysis of data gathered through research and the investor social network. The portfolio when accessed from the tool bar by the user shows a number of shares and a purchase price for each listing. Only the user can view his or her own portfolio listing 486 with these data. The user selectively chooses how much of the portfolio data is shared with the second user, the user having the ability to limit as well as grant a plurality of levels of access to other users, setting the access level for each user who is a friend in the social network.

Referring to FIG. 4, a user joins the investor social network by selecting the register button 492 and filling out an on-line form, which is not shown, with basic biographical information. The user selects a level of service and a method of payment, the level of service determining the speed of market data delivered to the user by the website, the higher level of service streaming real time data, the lower level of service streaming with a slight delay. A user selects also membership as a user or as an educator.

Once a user joins the social network, the user selectively joins at least one group. Groups can have group profile pages accessible to other members, similar to profile pages for individual users. Groups are formed for investing clubs, where individual pool resources and invest as one entity or by clients of a trading house. The webpages are maintained by a group owner. Group members have full access to the group profile page and portfolio. The group owner accepts or rejects a request to join the group. The group profile page allows viewing the last five users added to the group, the last five forums where the group owner posted, the last five videos the group uploaded, as well as the last five snapshots the group created. The group profile page allows viewing of the full group profile, including, for example, but not limited to, all the members of the group, all forums posted to the group, all videos uploaded by the group, the group's watch lists and portfolio. The group owner presents audio and video seminars on investment topics by streaming audio and video content or by uploading audio and video files; the group owner selecting whether the seminars are accessible by group members only or open to all users of the investor social network.

Referring to FIG. 4, the user accesses a library of educational materials, such as video, audio and text that explain trading and financial markets through a library tab 484 on the tool bar 408. In addition to the library, users learn about investing through the social network of the system. Expert investment professionals, either independent or from trading houses join the social network as an educator and post video and audio content to users. The educator member has a plurality of different access and privileges than a user. The social network system provides access to experts and trading houses worldwide as educator members to present audio and video seminars on investment topics by streaming audio and video content or by uploading audio and video files. The social network also provides contests for users, challenging users to create portfolios meeting contest criteria. Other users view a winning portfolio to learn a plurality of different success strategies for investing.

Those of ordinary skill in the art will understand that the illustrative window displays are to be interpreted in an exemplary manner and that displays different from those shown and described herein can be used within the scope of the present disclosure. For example, features of the displays can be combined, separated, interchanged, and/or rearranged to generate other displays.

The investor social networking system 12, as shown in FIG. 1, has a plurality of software systems and software applications residing typically on at least one system server 20 networked to the Internet 30, the system server 20 linking to at least one user running a software client application on a personal computing device, that allows the user to connect to the Internet 30 and access the social networking system on the system server 20. The personal computing device is, for example, but not limited to a personal computer 42, a smart phone 44, a tablet computer 46, or a personal digital assistant (PDA) 48. The configuration and interconnection of such network and personal devices can of course be varied, and substituted with other technologies both presently available and subsequently available, while adhering to the principles of the present invention. The network server 20 connects both to the personal computing device 42, 44, 46, 48 of the user and to a plurality of servers 22 on the Internet 30, the other servers 22 providing financial information to the server 20 of the system and the means to order financial transactions, the server of the system aggregating financial information and transmitting the aggregated financial information to the personal computing device of the user 42, 44, 46, 48, when the user selectively requests financial information. The system server 20 provides a secure link to a network server 24 of a financial institution, such as, for example, but not limited to, a trading house, a brokerage, a dealer, or a bank, that executes financial transactions so that the user can place an order to buy or sell a financial instrument while using the financial social networking website.

Figure 2:
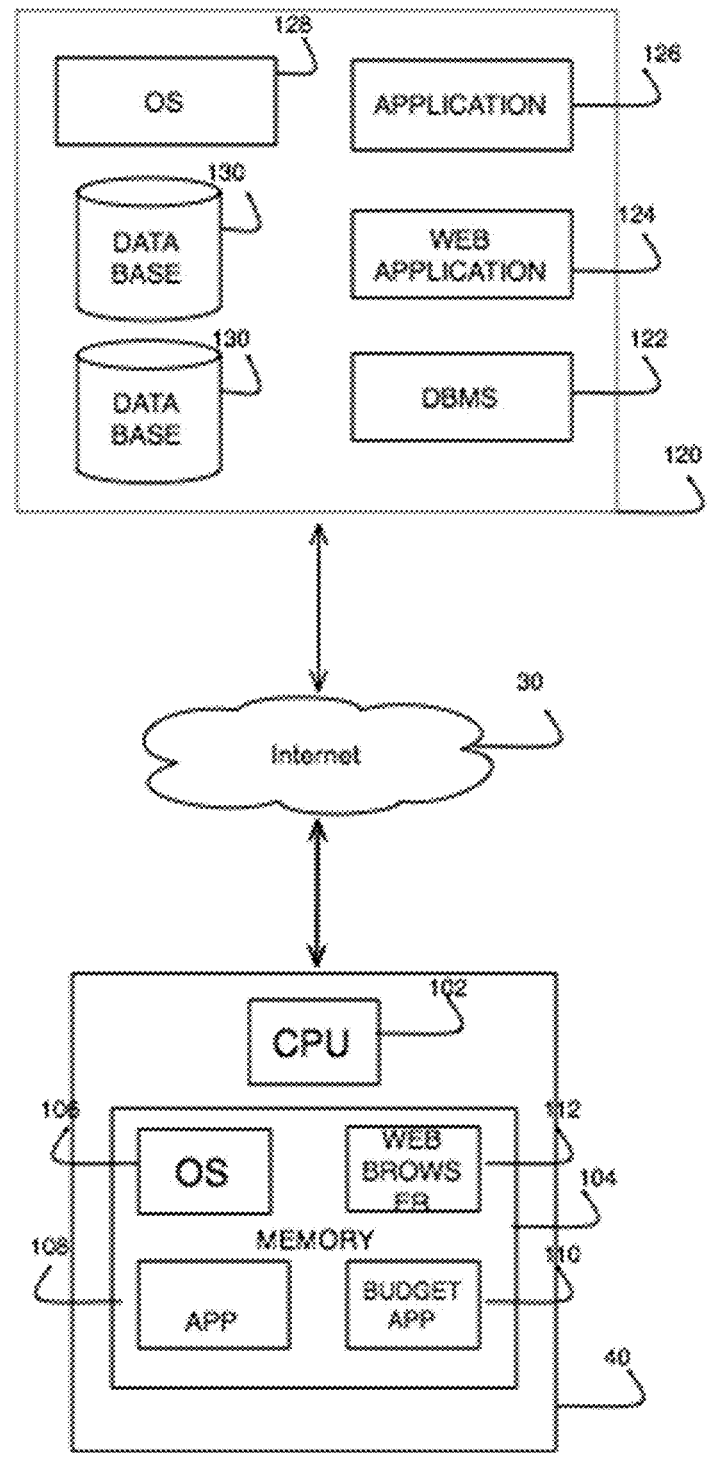
FIG. 2 is a block diagram of a system server in the social networking system connecting to a user on a personal computing device.

FIG. 2 shows a schematic diagram of the system server 20 connecting to the personal computing device of the user. The system server 20 has software for operating the system that includes, but is not limited to, an operating system 128 with communications software for connecting to the Internet 30, drivers and other software utilities necessary for the server to operate, which is well known to those of ordinary skill and the details of which are beyond the scope of this discussion. The system server also has a plurality of storage devices 130, including, for example, but not limited to, storage devices 130 for maintaining a membership database and archiving financial information and includes a data base management tool 122 that stores, sorts and retrieves data from the storage devices 130. It is also understood by those of ordinary skill that the system server 20 is not limited to a single device, but can be multiple devices electronically connected and operating together to perform a plurality of functions of the system server, such as in a distributed server network.

The system server 20 has a software application 126 of the invention, the software application connecting to the Internet 30, serving the pages as described herein to the user with the functions described herein, the functions associated with the pages. The software application 126 of the invention receives and collects financial information from other servers connected to the Internet, sorting, selecting and displaying the financial information in a formatted display selected by the user.

FIG. 2 shows the personal computing device 40 of the user used to invoke the investor social networking system. The personal computing device has a central processing unit (CPU) 102, memory 104 and software for operating the system that includes, but is not limited to, an operating system 106 with communications software for connecting to the Internet 30, and other software utilities necessary for the device to operate, which is well known to those of ordinary skill and the details of which are beyond the scope of this discussion. The personal computing device has a web browser 112 that when the device connects to the Internet 30, the browser retrieves selected pages of the investor social networking system website, allowing the user to interact with the system, by providing the means to enter data into the system and the means to display the selected pages of the website of the system. Optionally, the personal computing device has an "app" 108 for connecting directly and specifically to the investor social networking system. The "app" is a software application that performs the tasks required to interact with the investor social networking system, the app 108 adapting the means of entering data and displaying the selected pages for the specific personal computing device. The personal computing device optionally has a personal financial software application 110, such as the non-limiting examples, QUICKEN® (QUICKEN® is the registered trademark of Intuit Corporation, Menlo Park, Calif.) or iBANK® (iBANK® is the registered trademark of IGG Software, LLC, Putney, Vt.). The investor social networking system allows the data in the personal financial software application 110 to be uploaded as a means to create an online portfolio.

Figure 3:
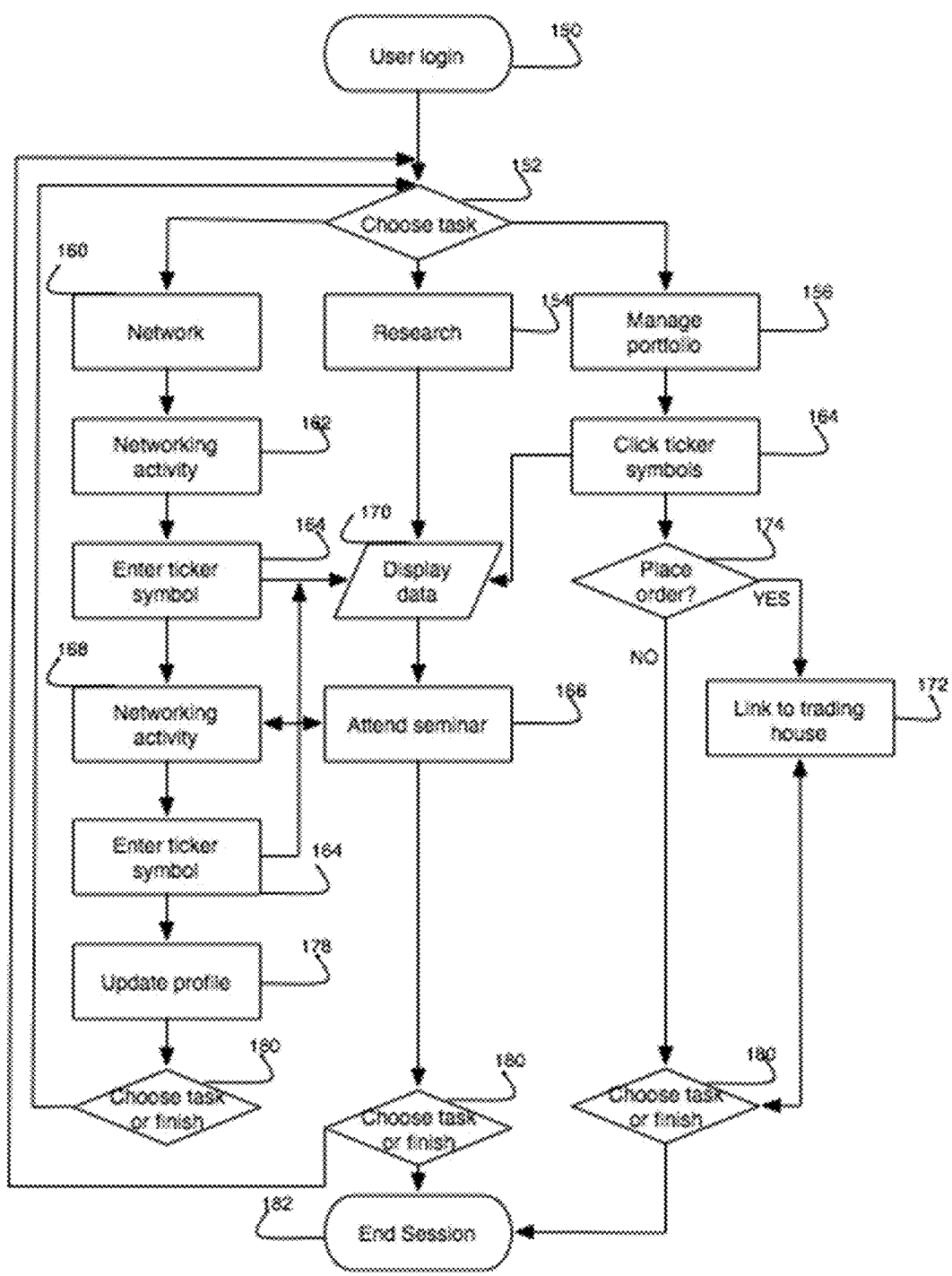
FIG. 3 is a flow chart of user actions in the investor social networking system.

The user visits the website of the investor social networking system as shown in FIG. 3. If the user is a member, the user securely logs into the system 150 to access the selected functions of the website. The user has access based on a selected level of membership chosen at the time of enrollment as described hereinbelow. The user selects a task 152 such as researching financial instruments 154, managing the user's investment portfolio 156 or engaging with other users directly or indirectly in the social network 160 of the system. The system allows the user to move between the tasks easily and seamlessly. In one example, the user researches 154 a financial instrument by selecting from the pull-down menus the data desired and entering a ticker symbol into a search box. The system displays the data 170. The user may continue to research 154, and for example, search for data on the market sector of the financial instrument. After reviewing the research, the user goes to the social network 160. Using the social networking tools, the user goes to a networking activity, such as the chat room 162 and begins chatting with another user. During the chat, the users use the ticker symbol prefix 164 to research the associated financial instrument. After the research is displayed 170, the user decides to either buy or sell the financial instrument discussed in the chat and moves to portfolio management function 156. The user reviews the financial instrument data by clicking on the symbol 162 and decides to place an order 174 to be executed by a brokerage or trading clearinghouse by clicking on the trading link 172 in the portfolio listing. After placing the order, the user chooses 180 to return to the social network 160, research 154, moving back and forth between the functions. While researching, the user chooses to attend an online seminar 166. While engaging in a second networking activity 168, such as a forum, the user learns about an online seminar and chooses to attend the seminar 166. While in the forum, the user wishes to learn more about a financial instrument that is discussed in the forum. The user clicks on the ticker symbol and the system displays the data 170. When the user complete networking activities, the user updates the user profile 168. After updating the user profile, the user chooses 180 to research, manage the user's portfolio or continue networking. When the user decides to stop researching financial instruments, managing the user's investment portfolio and engaging in the social network of the system, the user is finished and logs off the system and ends the session 182.

In conclusion, herein is presented an online investment social network that allows individuals interested in investing in stocks, commodities, bonds, foreign exchange, futures, and other types of financial instruments to track their investments and discuss them with other individuals that have a similar interest as well as buy or sell financial instruments through a social networking website. The invention is illustrated by example in the drawing figures, and throughout the written description. It should be understood that numerous variations are possible, while adhering to the inventive concept. Such variations are contemplated as being a part of the present invention.

What is claimed is:

1. A method comprising:
   maintaining a computerized social networking system having a plurality of users including a first user and a second user;
   within the system:
      facilitating receipt of a social networking message from the first user for communication to at least the second user, the message containing a ticker symbol as input by the first user;
      automatically converting the ticker symbol within the message into a hyperlink;
      causing to display the communicated message to at least the first user and the second user, the hyperlink appearing as the ticker symbol within the displayed message, the hyperlink operative to initiate a synoptic display of financial data for a financial instrument corresponding to the ticker symbol, the synoptic display is internal to the system.

2. The method of claim 1, wherein the message is selected from the group consisting of an intra-system chat message, an intra-system forum post message and an intra-system mail message.

3. The method of claim 1, wherein the system including an investing group having a group page and a group portfolio containing the ticker symbol, the group managed via a group owner, the group including the first user and the second user, the group having members with full access to the group page and the group portfolio, the group owner presenting a seminar within the group based at least on the financial instrument, the seminar includes at least one of audio data and video data, the group owner selecting access level to the seminar from outside the group.

4. The method of claim 3, wherein the system including a search interface accessible to the users, the interface is operative to provide for searching of the system for the group portfolio at least based on the ticker symbol.

5. The method of claim 1, wherein the system including a personal portfolio for one of the users, the portfolio containing the ticker symbol, the portfolio concurrently displaying with a secure link for direct entry into a trading house system in order to place an order for the financial instrument, the trading house executing the placed order, the one of the users selecting extent of the portfolio data sharing with other system users.

6. The method of claim 1, wherein the system including a financial instrument watch-list for one of the users, the watch-list containing the ticker symbol, the system including a search interface accessible to the users, the interface operative to provide for searching of the system for the watch-list at least based on the ticker symbol.

7. The method of claim 1, wherein the system including a plurality of profiles for the users, at least one of the profiles having a snapshot visual element operative to cause display of a graphical financial performance representation of the financial instrument for a selected time period.

8. The method of claim 7, wherein the at least one of the profiles including at least one of a poll visual element operative to cause user polling based on the ticker symbol and a video visual element operative to cause video display based on the ticker symbol, the polling and the video internal to the system, at least one of the polling information and the video information configured for intra-system mailing, the video as uploaded by one of the system users.

9. The method of claim 1, wherein the system provides a plurality of levels of service based a plurality of levels of price, the level of service is based on market data speed at least for the synoptic display.

10. The method of claim 1, wherein the system including a library area operative to include a plurality of financial educational materials from a user who is marked in the system as an educator based on self-association via at least one of when originally joining the system and after joining the system, the educator marking having a plurality of levels of access different than an ordinary user of the system.

11. The method of claim 1, wherein the system providing contests for the users, the contests based on creating portfolios meeting contest criteria, one of the portfolios including the ticker symbol.

12. The method of claim 1, wherein the system is operative to receive personal financial data from a personal financial data source external to the system.

13. A computer program product comprising:
  a tangible storage medium readable by a processing circuit and storing instructions for execution by the processing circuit for performing a method, the method comprising:
    maintaining a social networking system having a plurality of users including a first user and a second user;
    within the system:
      facilitating receipt of a social networking message from the first user for communication to at least the second user, the message containing a ticker symbol as input by the first user;
      automatically converting the ticker symbol within the message into a hyperlink;
      causing to display the communicated message to at least the first user and the second user, the hyperlink appearing as the ticker symbol within the displayed message, the hyperlink operative to initiate a synoptic display of financial data for a financial instrument corresponding to the ticker symbol, the synoptic display is internal to the system.

14. The product of claim 13, wherein the message is selected from the group consisting of an intra-system chat message, an intra-system forum post message and an intra-system mail message.

15. The product of claim 14, wherein the system including an investing group having a group page and a group portfolio containing the ticker symbol, the group managed via a group owner, the group including the first user and the second user, the group having members with full access to the group page and the group portfolio, the group owner presenting a seminar within the group based at least on the financial instrument, the seminar includes at least one of audio data and video data, the group owner selecting access level to the seminar from outside the group, the system including a search interface accessible to the users, the interface is operative to provide for searching of the system for the group portfolio at least based on the ticker symbol.

16. A system comprising:
  a computer processor; and
  an application configured to execute on the processor, the application implementing a method, the method comprising:
    maintaining a social networking service having a plurality of users including a first user and a second user;
    within the service:
      facilitating receipt of a social networking message from the first user for communication to at least the second user, the message containing a ticker symbol as input by the first user;
      automatically converting the ticker symbol within the message into a hyperlink;
      causing to display the communicated message to at least the first user and the second user, the hyperlink appearing as the ticker symbol within the displayed message, the hyperlink operative to initiate a synoptic display of financial data for a financial instrument corresponding to the ticker symbol, the synoptic display is internal to the service.

17. The system of claim 16, wherein the message is selected from the group consisting of an intra-service chat message, an intra-service forum post message and an intra-service mail message.

18. The system of claim 17, wherein the service including an investing group having a group page and a group portfolio containing the ticker symbol, the group managed via a group owner, the group including the first user and the second user, the group having members with full access to the group page and the group portfolio, the group owner presenting a seminar within the group based at least on the financial instrument, the seminar includes at least one of audio data and video data, the group owner selecting access level to the seminar from outside the group, the service including a search interface accessible to the users, the interface is operative to provide for searching of the service for the group portfolio at least based on the ticker symbol.

19. The system of claim 18, wherein the service including a personal portfolio for one of the users, the portfolio containing the ticker symbol, the portfolio concurrently displaying with a secure link for direct entry into a trading house system in order to place an order for the financial instrument, the trading house executing the placed order, the one of the users selecting extent of the portfolio data sharing with other system users.

20. The system of claim 19, wherein the service including a financial instrument watch-list for one of the users, the watch-list containing the ticker symbol, the service including a search interface accessible to the users, the interface operative to provide for searching of the service for the watch-list at least based on the ticker symbol.

\* \* \* \* \*